United States Patent
Kopycinski

[11] Patent Number: 6,148,746
[45] Date of Patent: Nov. 21, 2000

[54] METHOD AND APPARATUS FOR APPLICATION OF ANHYDROUS AMMONIA

[76] Inventor: John Kopycinski, Rte.1, Box 144, Chappell Hill, Tex. 77426

[21] Appl. No.: 09/321,175

[22] Filed: May 27, 1999

[51] Int. Cl.[7] .................................................... A01C 23/02
[52] U.S. Cl. ................................................................ 111/119
[58] Field of Search .............................. 111/118, 119, 120, 111/123, 124, 125, 129, 52, 200, 915; 239/63, 155

[56] References Cited

U.S. PATENT DOCUMENTS

| | | | |
|---|---|---|---|
| 2,843,067 | 7/1958 | Dugan | 111/129 |
| 2,973,729 | 3/1961 | Peck | 111/119 |
| 3,799,079 | 3/1974 | Dietrich | 111/123 |
| 4,458,609 | 7/1984 | Tofte | 111/119 |
| 4,723,495 | 2/1988 | Doetrich, Sr. et al. | 111/123 |
| 4,726,303 | 2/1988 | Degelman et al. | 111/52 |
| 4,746,349 | 5/1988 | Becker | 71/6 |
| 5,240,080 | 8/1993 | Bassett et al. | 111/119 X |

*Primary Examiner*—Robert E. Pezzuto
*Attorney, Agent, or Firm*—Vinson & Elkins, L.L.P.

[57] ABSTRACT

In a method and apparatus for applying anhydrous ammonia fertilizer to soil, a soil penetrating knife produces a substantially continuous elongated furrow in the soil for receipt of the anhydrous ammonia; a dispensing tube associated with the knife dispenses liquid anhydrous ammonia continuously into the furrow and second tube associated with the knife continuously dispenses a spray of an absorbent liquid into the furrow for absorbing liquid and gaseous anhydrous ammonia to thereby reduce evaporative loss of anhydrous ammonia from the soil.

14 Claims, 1 Drawing Sheet

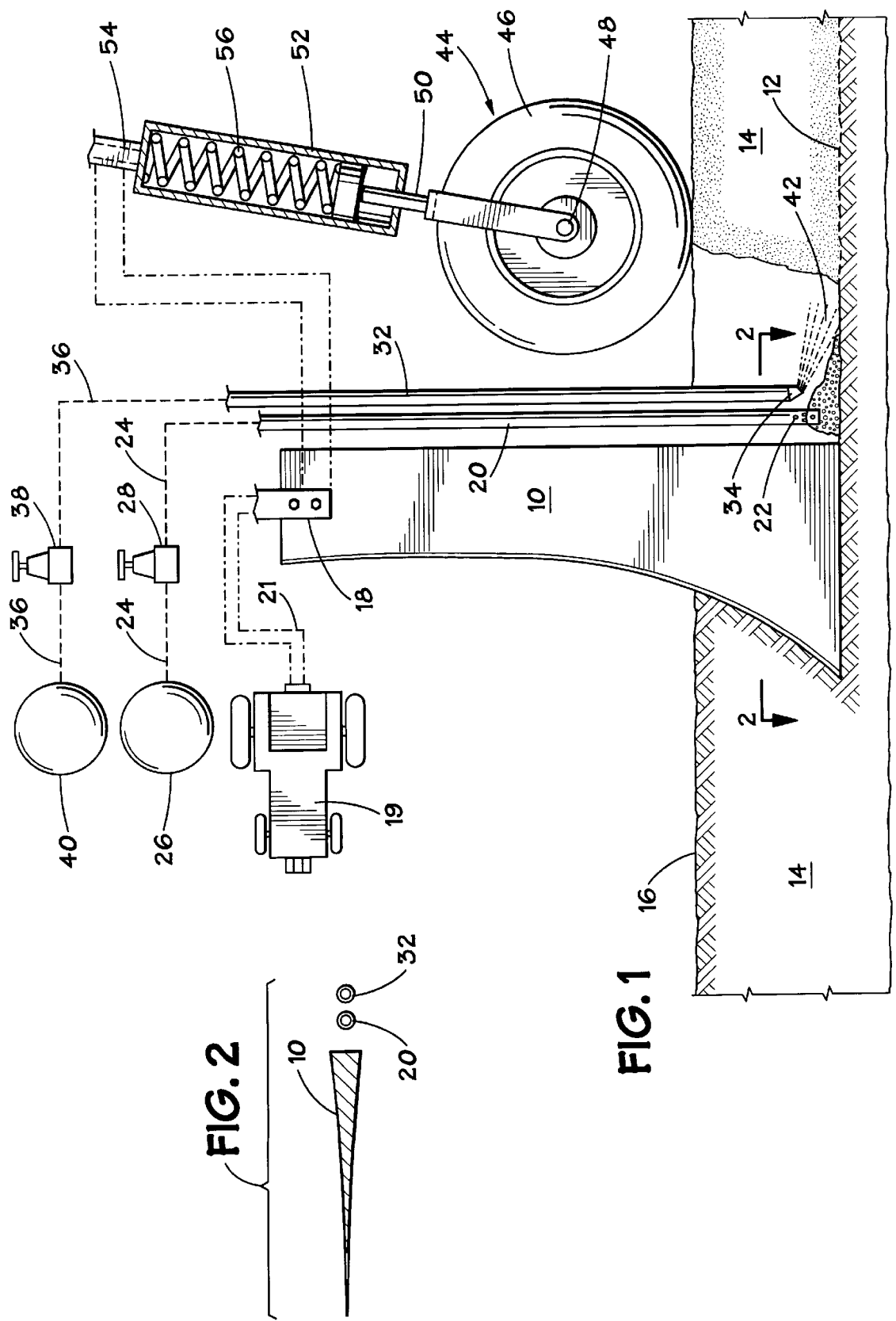

METHOD AND APPARATUS FOR APPLICATION OF ANHYDROUS AMMONIA

BACKGROUND OF THE INVENTION

The present invention generally relates to application of liquid anhydrous ammonia as a fertilizer and, more specifically, to an improved method and apparatus for application of anhydrous ammonia in combination with a covering spray of water or other suitable liquid to combine with the anhydrous ammonia, so as to prevent its escape into the atmosphere.

Farmers have used anhydrous ammonia for many years as a highly effective fertilizer for fixing nitrogen in soil, especially because it is relatively cheap compared to other forms of nitrogen fertilizers. Anhydrous ammonia used for such purposes is stored in a liquid state, but quickly evaporates into a gaseous state at atmospheric pressure. In order to reduce the escape of gaseous ammonia into the atmosphere, application devices conventionally use compaction wheels following closely behind the ammonia injection apparatus so as to close the injection trench and compact the soil so as to trap the ammonia in the ground. Such compaction wheels often work satisfactorily in relatively loose or sandy soils, but are less effective in clay soils which tend to form large, dense clumps. In such difficult to compact soils, a significant portion of the anhydrous ammonia tends to escape into the atmosphere after its injection into the soil. As a result, its effectiveness as a fertilizer is greatly diminished.

Various means have been tried in the past to improve the utility of anhydrous ammonia as a fertilizer for clay and other compacted soils. These methods have included a variety of shapes of knives, scrapers, disks and pack wheels. Unfortunately, all of such prior art methods have proven to be only partially successful at trapping anhydrous ammonia in the soil.

SUMMARY OF THE INVENTION

It is, accordingly, the primary object of the present invention to provide an improved method and apparatus for application of anhydrous ammonia as a fertilizer.

A further object is to provide such a method and apparatus which provides for improved retention of anhydrous ammonia in the soil after application.

A still further object is to provide such a method and apparatus which includes means for applying a covering spray of water, another aqueous liquid, or another suitable liquid which quickly absorbs or combines with anhydrous ammonia, so as to prevent its escape from the soil.

A still further object of the present invention is to provide such a method and apparatus which includes an improved design for a wheel for compacting the soil following application of the anhydrous ammonia.

BRIEF DESCRIPTION OF THE DRAWINGS

These and other objects and advantages of the invention will be apparent from the following detailed disclosure of a preferred embodiment of the invention and from the accompanying drawings in which:

FIG. 1 is a schematic illustration, in elevation and partly in section, of a preferred embodiment of an apparatus in accordance with the invention and suitable for use in performing the method of the invention; and FIG. 2 is a detailed illustration, taken along line 2—2 of FIG. 1.

DETAILED DESCRIPTION OF THE PREFERRED EMBODIMENT

Referring now to FIG. 1, there is illustrated schematically at 10 an agricultural implement commonly known as a knife or chisel plow knife which comprises an elongated wedge-shaped blade adapted to penetrate the soil to a predetermined depth, so as to form a continuous trench or furrow 12 in the soil 14. The bottom of knife 10 may extend any desired distance below the surface 16 of the ground such as, for example, approximately 4". The knife 10 is suitably mounted as, for example, by bracket 18 to a frame or carriage (not shown) by means of which it may be mounted on or pulled by a tractor, indicated schematically at 19. The knife 10 is suitably mechanically connected to the tractor 19, as indicated by broken line 21, so that the knife may be propelled forwardly along the surface of the soil, and suitably raised or lowered as desired for engagement with the soil. Although only one blade 10 is illustrated, it will be appreciated that in most applications a plurality of parallel blades 10 will be provided for simultaneously injecting anhydrous ammonia into a plurality of substantially continuous and parallel furrows 12.

Mounted behind the blade 10, and preferably adapted to extend, in use, below the surface of the soil 16, but to terminate slightly short of the bottom of blade 10, there is provided a first elongated tubular member 20 suitably closed at the bottom and having a plurality of perforations 22 near the lower end of the tube 20. Tube 20 is mechanically associated with the knife 10, so that it is propelled forward by the tractor 19 along with the knife 10. Tube 20 provides dispensing means for continuously dispensing a predetermined quantity of the liquid anhydrous ammonia into the furrow 12 as the knife blade 10 is propelled forward. Flow lines 24 suitably interconnect the tube 20 with a tank 26 which provides a sources of liquid anhydrous ammonia. At ambient temperatures, anhydrous ammonia, in order to be maintained in the liquid state, must be kept under pressure. In actual practice, tank 26 may be, for example, a large capacity (on the order of 1,000 gallons) pressure tank mounted on a wheeled carriage and adapted to be pulled behind the knife 10 by the same tractor pulling the knife. Suitable flow regulator means 28 are provided in flow line 24 for regulating the flow of liquid anhydrous ammonia from the tank 26, through line 24 and tube 20 to the perforations 22. The flow regulator may be any desired type such as, for example, one adapted to meter flow based upon pressure differential or flow volume. The pressure of the anhydrous ammonia within the tank 26 is sufficient to impel liquid anhydrous ammonia to flow through flow lines 24 and flow regulator means 28, down through tube 20 and out through perforations 22, where it will exit into the furrow 12.

The anhydrous ammonia supplied into the furrow 12 contains large amounts of nitrogen which, if retained in the soil, will provide nitrogen fertilizer for crops. In accordance with the present invention, the amount of nitrogen fixed in the soil from the anhydrous ammonia spray is substantially increased by providing, in conjunction with the anhydrous ammonia, a covering spray of a suitable absorbent liquid adapted to quickly absorb or combine with the ammonia. The absorbent liquid should, of course, be less volatile than the anhydrous ammonia. When absorbed into a less volatile liquid, the partial pressure of anhydrous ammonia will be reduced, thus reducing its tendency to evaporate into the atmosphere. Anhydrous ammonia is highly hydroscopic and will quickly absorb, or be absorbed into, liquid water. Since water is much less volatile than the anhydrous ammonia, it will retain anhydrous ammonia in the soil for a longer period of time and therefore provides a suitable absorbent liquid.

For dispensing the absorbent liquid, there is provided in accordance with the present invention, a second elongated tube 32 having a lower nozzle opening or slit 34 and suitably connected by flow lines 36 and pump 38 to a tank 40, which provides a source of an absorbent liquid, such as water, for use in accordance with the method of the invention. Tank 40 also may be mounted on a carriage or the like and pulled by the same tractor 19 as the remainder of the apparatus.

Absorbent liquid from tank 40 flows through flow lines 36 to pump 38 where it is pressurized and supplied through additional flow lines 36 and tube 32 to exit from nozzle 34 as a fan-shaped spray of liquid 42 above the anhydrous ammonia. The liquid spray pattern 42 is designed to substantially fill the confines of trench or furrow 12 above the anhydrous ammonia, so that gaseous anhydrous ammonia formed by evaporation cannot escape from the trench without encountering the absorbent liquid spray, which as it falls to the bottom of the trench, quickly combines with both the liquid and gaseous anhydrous ammonia. In one embodiment, pump 38 pressurizes the absorbent liquid to approximately 35 psi gauge and the nozzle 34 is formed merely by crimping the trailing edge of tube 32 into an elongated opening approximately one-half millimeter wide, so as to spray a thin stream of absorbent liquid in the shape of a fan into the furrow 12. In another embodiment, a slit is formed in the tube 32, preferably at about a 45° downward sloping angle. The inner edge of the slit creates a pin hole opening in the tube 32. The liquid coming out of the pin hole forms a spray pattern to cover the trench. Other nozzle types may, of course, be used.

As the liquid anhydrous ammonia pours out of the tube 20, it immediately begins to evaporate into a gaseous state. However, any gas that rises from the furrow immediately encounters and is absorbed into the absorbent liquid spray and falls back into the soil with the absorbent liquid. Additionally, as the liquid falls into the bottom of the furrow, it mixes with the remaining liquid anhydrous ammonia, thus greatly reducing the vapor pressure of the ammonia compound and reducing the tendency to further evaporation. The desired ratio of absorbent liquid to ammonia may vary depending upon conditions such as the amount of moisture already in the soil, the ambient temperature and the volume of ammonia desired for use as a fertilizer. Under most soil and moisture conditions, utilizing approximately one part absorbent liquid to two parts anhydrous ammonia has been found effective to retain the fertilizer in the soil.

It will be apparent that the process also may utilize as the absorbent liquid any desired aqueous solution such as, for example, one containing additional trace elements, minerals, fertilizer components, pesticides, fungicides, other components desired to be added to the soil which are compatible with the anhydrous ammonia. Alternatively, a covering spray of other liquid which will suitably combine with the anhydrous ammonia may be used. For example, liquid phosphorus also quickly absorbs the anhydrous ammonia while at the same time providing desirable quantities of phosphorus fertilizer for the soil.

In order to retain the ammonia and absorbent liquid in the soil, it is preferred to quickly close the trench 12 and suitably compact the soil. For this purpose, there preferably is provided in conjunction with the blade 10 and water and anhydrous ammonia injection tubes, a following compaction wheel, indicated schematically at 44. Wheel 44 comprises a tire or other suitable tread element 46 suitably journaled at 48 onto an elongated strut 50. An elongated cylindrical housing 52 surrounds the upper end of strut 50 and is suitably mounted, as by bracket 54, to the same frame, carriage or other apparatus mounting the knife blade 10, so that the compaction wheel advances along with the knife 10. A heavy duty coil spring 56 is confined by the cylinder 52 between the cylinder 52 and strut 50. With this arrangement, the weight of the frame or carriage mounting the knife blades 10 is carried by the tire 46 via the intermediate compression spring 56, which provides resilience for absorbing shocks and for maintaining substantially constant pressure between the tire tread and the soil surface for closing and compacting the soil above the furrow 12.

The method in accordance with the invention is carried out, utilizing the apparatus shown and described above, such method comprising the steps of forming an elongated furrow in the soil, injecting liquid anhydrous ammonia into such furrow, spraying an absorbent liquid into the furrow, absorbing the anhydrous ammonia into the absorbent liquid so as to prevent its evaporative escape from the furrow and then, preferably, closing the furrow and compacting the soil.

While the invention has been described in terms of a preferred embodiment, it is not so limited, and many additions, deletions and modifications to the embodiment illustrated and described may be made without departing from the spirit and scope of the invention as hereinafter claimed.

What is claimed is:

1. An apparatus for application of anhydrous ammonia fertilizer to soil, said apparatus comprising knife means adapted to be propelled forwardly along the surface of said soil while penetrating said soil to a predetermined depth, for opening an elongated substantially continuous furrow in said soil;

dispensing means associated with said knife means for continuously dispensing a predetermined quantity of anhydrous ammonia into said furrow as said knife means is propelled forwardly;

spray means for dispensing a substantially continuous spray of an absorbent liquid into said furrow in a pattern designed to substantially fill the confines of said furrow above said anhydrous ammonia dispensed into said furrow as said knife means is propelled forwardly, whereby said absorbent liquid spray will tend to reduce evaporative loss of said dispensed anhydrous ammonia from said soil.

2. The apparatus according to claim 1 wherein said absorbent liquid comprises water.

3. The apparatus according to claim 1 wherein said absorbent liquid comprises liquid phosphorus.

4. The apparatus according to claim 1 comprising additionally a compaction wheel associated with said knife means for continuously compacting said soil rearwardly of said knife means, dispensing means and spray means to thereby close said furrow and further reduce evaporative loss of said anhydrous ammonia from said soil.

5. The apparatus according to claim 4 wherein said compaction wheel includes resilient means for exerting a substantially uniform downward force on said compaction wheel as said compaction wheel is propelled forwardly along the surface of said soil in association with said knife means.

6. The apparatus according to claim 5 wherein said resilient means comprises a compression spring.

7. The apparatus according to claim 1 comprising additionally a source of liquid anhydrous ammonia and means for flow connecting said source of liquid anhydrous ammonia to said dispensing means.

8. The apparatus according to claim 7 comprising additionally flow regulator means associated with said flow connecting means for controlling the volume of said liquid anhydrous ammonia flowing from said source of liquid anhydrous ammonia through said flow connecting means to said dispensing means.

9. The apparatus according to claim 1 comprising additionally a source of said absorbent liquid and means for flow connecting said source of absorbent liquid to said spray means.

10. The apparatus according to claim 9 comprising additionally pump means associated with said flow connecting means for pressurizing said absorbent liquid flowing from said source of absorbent liquid through said flow connecting means to said spray means.

11. A method for dispensing anhydrous ammonia fertilizer into soil, said method comprising:

forming a substantially continuous elongated furrow in said soil;

dispensing a predetermined quantity of anhydrous ammonia into said furrow;

spraying a predetermined quantity an absorbent liquid into said furrow in a pattern designed to substantially fill the confines of said furrow above said anhydrous ammonia dispensed into said furrow to reduce evaporative loss of said dispensed anhydrous ammonia from said soil.

12. The method according to claim 11 wherein said absorbent liquid comprises water.

13. The method according to claim 11 wherein said absorbent liquid comprises liquid phosphorus.

14. The method according to claim 11 comprising additionally the step of compacting said soil to close said trench.

* * * * *